(No Model.)
G. F. MOORS.
FRUIT GATHERING IMPLEMENT.
No. 466,795. Patented Jan. 12, 1892.
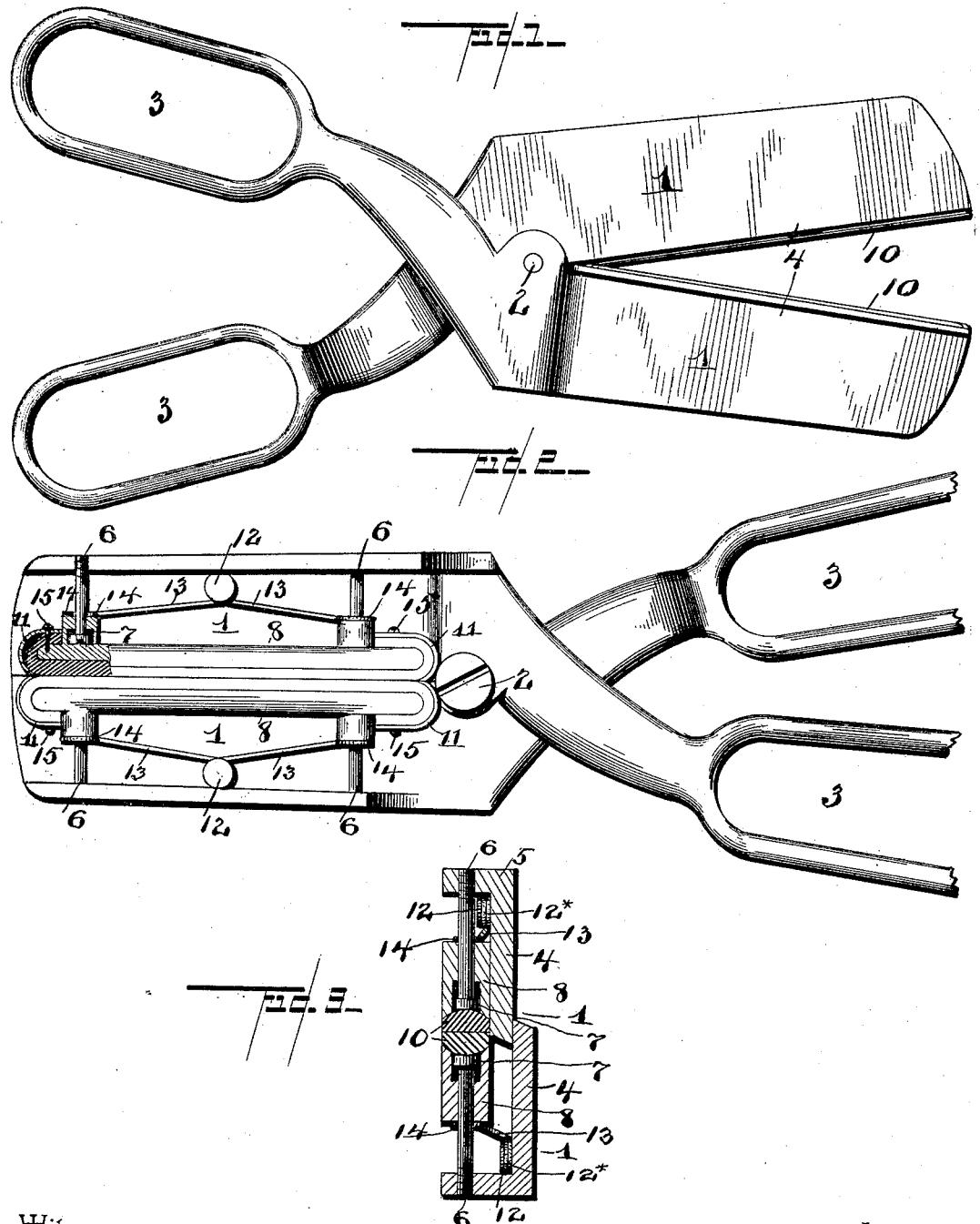
Witnesses:
Inventor
George F. Moors,
By his Attorneys
C. A. Snow & Co.

UNITED STATES PATENT OFFICE.

GEORGE F. MOORS, OF OWENSBOROUGH, KENTUCKY, ASSIGNOR OF ONE-HALF TO J. T. GRIFFITH, OF SAME PLACE.

FRUIT-GATHERING IMPLEMENT.

SPECIFICATION forming part of Letters Patent No. 466,795, dated January 12, 1892.

Application filed September 24, 1891. Serial No. 406,680. (No model.)

*To all whom it may concern:*

Be it known that I, GEORGE F. MOORS, a citizen of the United States, residing at Owensborough, in the county of Daviess and State of Kentucky, have invented a new and useful Fruit-Gathering Implement, of which the following is a specification.

This invention relates to a fruit-gathering implement, and is especially used for gathering grapes, the objects in view being to provide a hand device adapted to be operated by one hand and to sever the stems of fruits and flowers and retain the same after such severance, whereby the fruit may be transported to any waiting receptacle without any handling whatever.

Other objects and advantages of the invention will appear in the following description, and the novel features thereof will be particularly pointed out in the claims.

Referring to the drawings, Figure 1 is a side elevation of a fruit-gathering device constructed in accordance with my invention. Fig. 2 is a reverse view, partly in section. Fig. 3 is a transverse section.

Like numerals of reference indicate like parrs in all the figures.

1 1 designate the opposite members of a pair of shears, which are crossed and pivoted to each other, as at 2, and at one side of their pivot are provided with finger-receiving loops 3 and at the opposite side a pair of blades 4, the outer edges of which are provided with flanges 5, or, in other words, the blades are L-shaped.

Extending from each of the flanges is a pair of pins 6, which extend parallel with the blades, and said pins receive and enter sockets 7, formed in a pair of clamping-bars 8, located at the inner ends of the pins, the heads of the pins working therein. The inner faces of the bars are longitudinally grooved, and seated therein are rubber or other yielding frictional strips 10, which are maintained in position by U-shaped metal clips 11, which embrace the ends of the strips and the clamping-bars. Pins 12 extend from the inner faces of the blades midway between each of the pair of pins 6, and upon the former pins is located the eye 12*, formed at the centers of a pair of spring-wires 13, the opposite arms of which are diverged and bent to form elongated loops 14, each embracing a pin 6 and bearing upon a socket of an adjacent clamping-bar.

In use the device is employed as an ordinary pair of shears, and as the cut is made and the stem severed from the bush, tree, or vine said stem is grasped yieldingly between the frictional clamping-bars, and the device may be employed by the operator for transporting the fruit or flower to a basket or other receptacle carried by him or located upon the ground near him. If desired, a device of this kind may be carried in each hand. It will be seen that no handling whatever of the fruit or flower takes place, and the operation of picking the fruit or flower may be carried on by one hand, leaving the other free to carry the basket or manipulate a companion device.

From the foregoing description, taken in connection with the accompanying drawings, it will be seen that I provide a device of great simplicity, that can be cheaply manufactured and sold, and that facilitates, simplifies, and reduces the labor incurred in picking fruit, flowers, &c.

Should the frictional bands give out or become worn, the screws 15, passing through the clips and band and into the clamping-bars, may be readily removed and new bands substituted.

Having described my invention, what I claim is—

1. The combination, with the opposite pivoted members terminating at one side of their pivot in L-shaped blades, of pairs of pins extending from the flanges of the blades inwardly, clamping-bars perforated to receive the pins, and springs for normally forcing the bars together, substantially as specified.

2. The combination, with the opposite members pivoted together and terminating in front of their pivot in L-shaped blades and pairs of pins extending inwardly from the flanges of the blades and terminating in heads, of opposite clamping-bars having sockets for the reception of the pins and heads, and springs interposed between the flanges of the blades and the clamping-bars, substantially as specified.

3. The combination, with the opposite members pivoted together and terminating in front of their pivot in L-shaped blades, of pairs of headed pins extending from the flanges of the blades, a pair of clamping-bars having sockets for the reception of the heads of the pins and upon their inner faces grooved, friction-strips applied to their inner faces and located in the grooves, and springs interposed between the L-shaped flanges and the clamping-bars, substantially as specified.

4. The combination, with the opposite pivoted members having L-shaped blades, of the headed pins extending from the flanges of the blades, the clamping-bars having sockets for loosely receiving the pins, the friction-strips, and the wire springs at their extremities, bent to form elongated loops for embracing the pins and bearing on the bars and at their centers provided with eyes engaging pins on the blades, substantially as specified.

5. The combination, with the opposite members pivoted together and terminating in L-shaped blades, of a pair of clamping-bars yieldingly supported upon the blades and against each other opposite the meeting edges of the blades, elastic strips located upon the meeting faces of the bars and overlapping the ends thereof, U-shaped metal clips embracing said ends, and screws passed through the clips and strips and into the bars, substantially as specified.

In testimony that I claim the foregoing as my own I have hereto affixed my signature in the presence of two witnesses.

GEO. F. MOORS.

Witnesses:
C. M. MASON,
J. B. VICKERT.